(12) United States Patent
Hinkley et al.

(10) Patent No.: US 9,441,137 B2
(45) Date of Patent: Sep. 13, 2016

(54) EASILY DISPERSIBLE FORMULATIONS OF PIGMENTS AND THEIR USE IN TINTING BASE MEDIA

(71) Applicant: DRIKOLOR INC, Mar Vista, CA (US)

(72) Inventors: Simon Francis Robert Hinkley, Lower Hutt (NZ); Cameron James Tristram, Auckland (NZ); Rachel D'Arcy Lacy, Auckland (NZ)

(73) Assignee: DRIKOLOR INC, Mar Vista, CA (US)

( * ) Notice: Subject to any disclaimer, the term of this patent is extended or adjusted under 35 U.S.C. 154(b) by 0 days.

(21) Appl. No.: 14/840,871

(22) Filed: Aug. 31, 2015

(65) Prior Publication Data

US 2016/0186007 A1    Jun. 30, 2016

Related U.S. Application Data

(63) Continuation-in-part of application No. 14/639,207, filed on Mar. 5, 2015, now Pat. No. 9,120,950.

(30) Foreign Application Priority Data

Mar. 5, 2014    (NZ) ........................................ 622077

(51) Int. Cl.
    *C08L 33/02*      (2006.01)
    *C08L 71/02*      (2006.01)
    *C09D 171/02*     (2006.01)
(52) U.S. Cl.
    CPC .................................. *C09D 171/02* (2013.01)
(58) Field of Classification Search
    CPC ............ C09J 3/12; C09J 3/20; C09D 171/02
    USPC .......................... 524/378, 556, 186, 381, 505
    See application file for complete search history.

(56) References Cited

U.S. PATENT DOCUMENTS

| | | | |
|---|---|---|---|
| 4,089,699 | A | 5/1978 | Blackburn et al. |
| 6,972,305 | B1 * | 12/2005 | Griessmann ............. C09D 5/36 |
| | | | 106/401 |
| 8,124,672 | B2 | 2/2012 | Reisacher et al. |
| 2003/0047116 | A1 | 3/2003 | Egger et al. |
| 2006/0000392 | A1 | 1/2006 | Reisacher et al. |
| 2010/0298472 | A1 | 11/2010 | Bardelli |

FOREIGN PATENT DOCUMENTS

| | | |
|---|---|---|
| EP | 0 695 794 A2 | 2/1996 |
| GB | 1 499 660 | 2/1978 |
| WO | WO 01/74735 A1 | 10/2001 |
| WO | WO 2014/137226 A2 | 9/2014 |

OTHER PUBLICATIONS

Priority Document of U.S. Appl. No. 61/772,911, filed Mar. 5, 2013 (44 pgs.) for the WO 2014/137226 A2 publication of Lacy et al, International Publication Date Sep. 12, 2014.

* cited by examiner

*Primary Examiner* — Vu A Nguyen
(74) *Attorney, Agent, or Firm* — Nixon & Vanderhye P.C.

(57) ABSTRACT

Formulations of easily dispersible (ED) pigments comprising a combination of a carboxylic acid polymer and a non-ionic alkoxylated surfactant are disclosed. The combination is used in the formulation of a plurality of pigments. The formulations are suitable for mixing with a base medium at the point-of-sale (PoS) or by the end user.

8 Claims, 1 Drawing Sheet

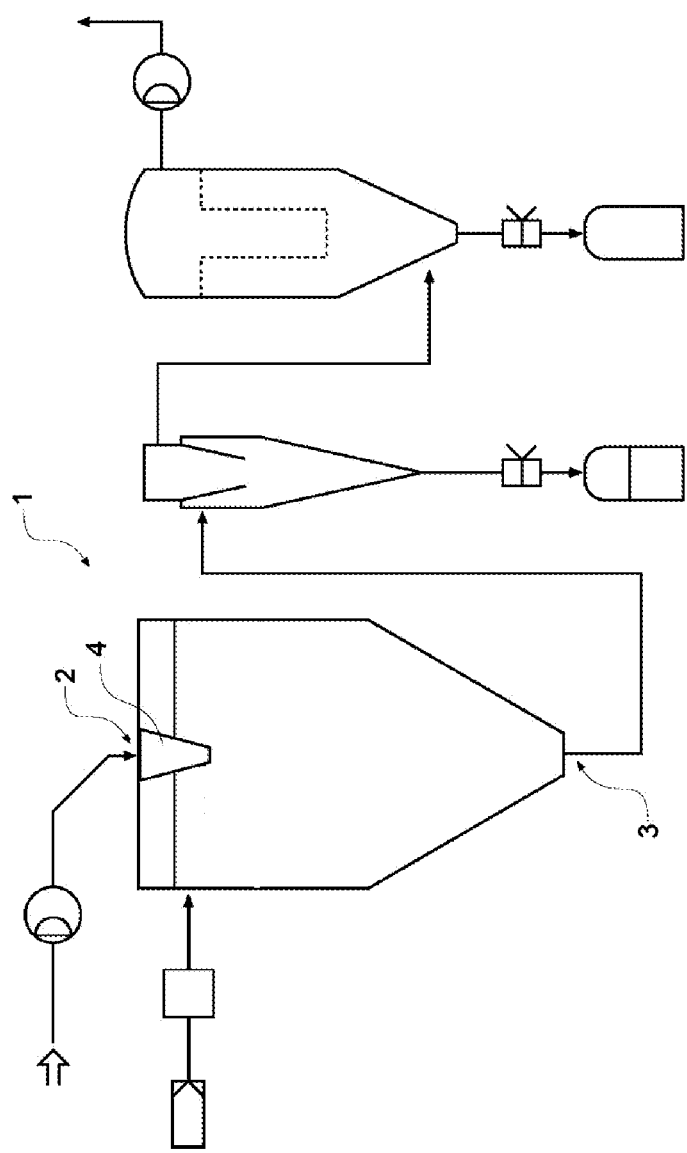

EASILY DISPERSIBLE FORMULATIONS OF PIGMENTS AND THEIR USE IN TINTING BASE MEDIA

This application is a continuation-in-part of application Ser. No. 14/639,207 filed Mar. 5, 2015 which claims priority to New Zealand Application No. 622077 filed Mar. 5, 2014, the entire contents of each of which are hereby incorporated by reference.

FIELD OF INVENTION

The invention relates to a combination of formulants capable of effectively dispersing a plurality of pigments in a base medium, methods for the preparation of formulations using the combination of formulants and the use of these formulations in colouring a base medium. In particular, the invention relates to formulations of easily dispersible (ED) "whole colour" suitable for mixing with a base medium at the point-of-sale (PoS) or by the end user. An example of a suitable base medium is acrylate paint.

BACKGROUND ART

The cost of pigments can be a substantial portion of the total cost of raw materials used in the manufacture of coloured media, including surface coatings such as paints. Individual pigments are processed and formulated in order to optimise their performance when added to a specific base medium. The sought after performance characteristics of these pigment preparations include stability during storage, rapid and uniform dispersibility on mixing with the base medium, and long-term maintenance of the appearance of the coloured medium, e.g. resistance to fading. The art is replete with methods of processing and formulating pigments where the objective is to optimise the performance of a single class of pigment. Examples include the methods disclosed in the publications of Aoba et al (2001), McKay (1973), Thomspon et al (2009) and Wilkinson (1966).

The publication of Aoba et al (2001) discloses a composite pigment of a blueish-green colour. The composite pigment comprises copper phthalocyanine and aluminium phthalocyanine. The composite is prepared by kneading a mixture of the independently comminuted pigments and resin so as to disperse the pigments in the resin. The publication of McKay (1973) discloses flocculation resistant phthalocyanine pigments. The pigments are prepared by milling a combination of a phthalocyanine pigment, a chloromethylated phthalocyanine compound and organic amines. Cyclohexylamines and n-butylamine are discloses as examples of organic amines used in the preparation of the pigments. The publication of Thomspon et al (2009) discloses quinacridone products used for colouring a variety of base media including paints. The products are crystal forms of solid solutions of 2,9-dimethyoxyquinacridone and 2,9-dichloroquinacridone. The publication of Wilkinson (1966) discloses solid solutions or mixed crystals in which at least one other component is a thiachromonoacridone. The pigment is provided as a solid solution as opposed to a formulation.

Further processing of such pigment preparations may still be required to ensure a base medium in which the primary particles of the pigment are uniformly dispersed is obtained. Additives may be required during this further processing to prevent excessive foaming and loss of capacity. Where pigment formulations are used to prepare coloured media at the point-of-sale (PoS) the capacity and time for further processing is limited. Historically, liquid pigment formulations have been used in PoS operations. The primary particles of the pigment may be regarded as being in a partially "pre-dispersed" state in these formulations. The use of liquid pigment formulations in PoS operations has many limitations as discussed in the publication of Lacy et al (2014). A need therefore exists for a formulation that permits a plurality of different pigment preparations to be prepared in a dry form that is easily and rapidly dispersible in a base medium. Examples of dry forms of pigment formulation asserted to be easily and rapidly dispersible in a base medium are disclosed in the publications of Rance et al (2007), Reischer and Gomez (2007), Reisacher et al (2008), Ortalano et al (2008), Tauber et al (2010), Plueg and Lopez (2010), Wenning and Loest (2010), Roy et al (2010) and Kruithof et al (2010).

The publication of Rance et al (2007) discloses pigment granules including mixtures of various organic or various inorganic pigments or mixtures of organic and inorganic pigments. In addition to these "tinting materials" the granules are disclosed as optionally containing at least one non-ionic surface-active additive based on polyethers such as unmixed polyalkylene oxides, like polyethylene oxides and polypropylene oxides, or alkylene oxide block copolymers or copolymers comprising polypropylene oxide and polyethylene oxide blocks. The publication states that the unmixed polyalkylene oxides and copolymers comprising polypropylene oxide and polyethylene oxide blocks are obtainable by polyaddition of the alkylene oxides to saturated or unsaturated aliphatic and aromatic alcohols and aliphatic amines. Suitable alkylene oxide block copolymers that are known and commercially available are identified in the publication by the trade names TETRONIC™ and PLURONIC™. These trade name products include alkoxylated adducts such as ethylenediamine tetrakis(ethoxylate-block-propoxylate) tetrol (BASF). The publication further states that alkylene oxide block copolymers may be selected with different hydrophilic-lipophilic balance values according to the medium in which the pigment granules are to be used, but does not appear to disclose any examples of formulations containing these formulants.

The publication of Reischer and Gomez (2007) discloses pigment preparations asserted to be comparable to liquid pigment formulations with regard to colour properties and dispersibility, but not requiring the addition of dried-crust inhibitors, freeze resistance enhancers and anti-skinners. The publication states that simply drying a liquid formulation does not provide solid pigment preparations having comparable application properties. The publication discloses pigment formulations including as an essential ingredient from 10 to 40% by weight of at least one non-ionic surface-active additive based on polyethers. The pigment granules disclosed are prepared by wet comminuting the pigment as an aqueous suspension in the presence of at least some of the non-ionic surface active additive. The suspension is then spray dried following addition of the balance of the additive. The additive melts at the drying temperatures used leading to the formation of substantially spherical granules. The additive used in the examples is a block copolymer based on either ethylenediamine/propylene oxide/ethylene oxide or propylene oxide/ethylene oxide as the additive. It is stated that the block copolymers are selected with different hydrophilic-lipophilic balance values depending on the application medium in which the pigment granules are to be used. The median particle size of the single pigment granules is disclosed to be in the range 270 to 330 μm. Examples of pigment granules including only a single pigment are disclosed.

The publication of Reisacher et al (2008) discloses solid pigment preparations comprising as essential constituents at least one pigment, at least one water-soluble surface active additive and an antioxidant. A filler (without self-colour) is an optional component of the "colour conferring component" comprising the pigment. Examples of formulations comprising a block copolymer based on propylene oxide/ethylene oxide as the water-soluble surface active additive and tetrakis[methylene(3,5-di(tert-butyl)-4-hydroxyhydrocinnamate)]methane (IRGANOX™ 1010), octadecyl 3,5-di-tert-butyl)-4-hydroxyhydroycinnamate (IRGANOX™ 1076) and tris[2,4-di(tert-butylphenyl)phosphite (IRGAFOS™ 168) as antioxidants are disclosed. The examples comprise a single pigment and do not include a filler. The antioxidant is included to stabilise the pigment preparations so they can be dried at temperatures of greater than 70° C. without risk of auto-ignition.

The publication of Ortalano et al (2008) discloses a stir-in pigment composition. The composition comprises one or more acetylenic-based surface-active agents. The publication of Tauber et al (2010) discloses pigment preparations comprising poly(alkyl ether). The publication of Plueg and Lopez (2010) discloses universal stir-in pigment preparations containing an additive based on polyalkylene glycols. The additive is an amino derivative of a polyalkylene glycol. The publication of Wenning and Loest (2010) discloses compositions for producing universal pigment preparations containing a combination of a block-copolymeric styrene oxide-containing polyalkylene oxide and a ketone-aldehyde resin. Surprisingly, the combination was found to be soluble in water. The publications of Roy et al (2010) and Kruithof et al (2010) disclose solid preparations comprising a pigment and a dispersant resin. The dispersant resins are polymers having pendant hydrophilic polyalkylene oxide side groups.

Despite these many alternatives the need for a formulation that permits a plurality of different pigment preparations to be prepared in a dry form that is consistently, easily and rapidly dispersible in a base medium remains. It is an object of the present invention to provide a combination of formulants that permit a plurality of different pigment preparations to be prepared in a dry, flowable, particulate form. It is an object of the present invention to provide an improved method of colouring base media such as paint at the point-of-sale. These objects are to be read in the alternative with the object at least to provide the public with a useful choice.

STATEMENT OF INVENTION

In a first aspect the invention provides a flowable particulate formulation for use in the preparation of coloured base media comprising primary particles of at least one pigment, a carboxylic acid polymer and a non-ionic alkoxylated surfactant. Preferably, the carboxylic acid polymer is an acrylic acid polymer. Preferably, a non-ionic alkoxylated surfactant is an ethylene oxide-propylene oxide diblock copolymer. Most preferably, the flowable particulate formulation comprises primary particles of at least one pigment, an acrylic acid polymer and an ethylene oxide-propylene oxide diblock copolymer. A preferred acrylic acid polymer is supplied under the trade name RHODOLINE 226/40™ (CAS #9003-04-7). A preferred ethylene oxide-propylene oxide diblock copolymer is supplied under the trade name MAXEMUL™ (CAS #697765-47-2).

Preferably, the flowable particulate formulation additionally comprises a hydroxylated amine. More preferably, the flowable particulate formulation additionally comprises 2-amino-2-methyl-1-propanol. A preferred 2-amino-2-methyl-1-propanol is supplied under the trade name AMP 95™ (CAS #124-68-5).

Preferably, the flowable particulate formulation is a spray dried flowable particulate formulation.

Preferably, the flowable particulate formulation consists essentially of primary particles of at least one pigment, a hydroxylated amine, a polycarboxylic acid and a non-ionic alkoxylated surfactant. Preferably, the flowable particulate formulation consists essentially of primary particles of a plurality of pigments, a hydroxylated amine, a polycarboxylic acid and a non-ionic alkoxylated surfactant. More preferably, the flowable particulate formulation consists essentially of primary particles of three or more pigments, a hydroxylated amine, a polycarboxylic acid and a non-ionic alkoxylated surfactant.

Preferably, the ratio by weight (w/w) of formulant to total pigment is in the range 0.5 to 3.6% hydroxylated amine, 0.56 to 4.52% polycarboxylic acid and 4.5 to 37.7% non-ionic alkoxylated surfactant. More preferably, the ratio by weight (w/w) of formulant to total pigment is in the range 0.5 to 2.3% hydroxylated amine, 0.8 to 2.8% polycarboxylic acid and 7.5 to 19% non-ionic alkoxylated surfactant. Most preferably, the ratio by weight (w/w) of formulant to total pigment is 0.95% hydroxylated amine, 1.2% polycarboxylic acid and 10% non-ionic alkoxylated surfactant.

Preferably, the carboxylic acid polymer is an acrylic acid polymer, the non-ionic alkoxylated surfactant is an ethylene oxide-propylene oxide diblock copolymer and the hydroxylated amine is 2-amino-2-methyl-1-propanol.

Preferably, the plurality of pigments are a combination of inorganic and organic pigments.

Preferably, the plurality of pigments are selected from the group consisting of: benzamidazole yellow (pigment code PY 154; azo yellow, yellow H3G; CAS #68134-22-5); isoindoline yellow (pigment code PY 139; deep yellow, yellow 3R; CAS #3688-99-0); pyrrole red (pigment code PR254; bright red; CAS #84632-65-5); dioxazine violet (pigment code PV 23; deep violet; CAS #6358-30-1); natural red iron oxide (pigment code PR 102; red ochre, CAS #1309-37-1); pyrrole orange (pigment code PO 73; bright orange; CAS #71832-85-4); phthalocyanine blue BGS (pigment code PB 15.3; fastogen blue; CAS #147-14-8); quinacridone red (pigment code PR 122; magenta (pink E); CAS #980-26-7); natural yellow iron oxide (pigment code PY 43; ocre havane; CAS #64294-91-3); phthalocyanine green BS (pigment code PG 7; phtalo green; CAS #1328-53-6); manganese brown (pigment code PBr8; umber 190; CAS #12713-03-0); manganese brown (pigment code PBr8; umber 390; CAS #12713-03-0); iron oxide hydroxide brown (pigment code PBr 6; umber 65; CAS #1309-37-1); natural red iron oxide (pigment code PR 102; venetian red); natural yellow iron oxide (pigment code PY 43; dark yellow ocre; CAS #64294-91-3); natural yellow iron oxide (pigment code PY 43; cyprus lemon ochre; CAS #64294-91-3); bone black (pigment code PBk 9; cosmic black; CAS #8021-99-6); iron oxide red (FE 203) (pigment code PR 101; R-5580; CAS #1309-37-1); yellow iron oxide (pigment code PY 42; yellow iron oxide; CAS #51274-00-1); chalk (pigment code PW 18; champagne chalk; CAS #1317-65-3); chrome oxide green (pigment code PG 17; chrome green; CAS #1308-38-9); ultramarine blue (pigment code PB 29; ultramarine blue; CAS #57455-37-5); ultramarine violet (pigment code PV15; ultramarine violet; CAS #12769-96-9); titanium dioxide (pigment code PW 6; CR-826; CAS #13463-67-7); ultramarine pink (pigment code PR 259; ultramarine pink; CAS #12769-69-9). More preferably, the pigments are a combination of pigments selected from the group consisting of: titanium dioxide (TiO2), yellow iron oxide (pigment code PY 42; yellow iron oxide; CAS #51274-00-1), pyrrole red (pigment code PR254; bright red; CAS #84632-65-5), quinacridone red (pigment code PR 122; magenta (pink E); CAS #980-26-7), dioxazine violet (pigment code PV 23; deep violet; CAS #6358-30-1) and chrome oxide green (pigment code PG 17; chrome green; CAS #1308-38-9). Most preferably the pigments are a combination selected from:

- titanium dioxide (TiO$_2$), yellow iron oxide (pigment code PY 42; yellow iron oxide; CAS #51274-00-1), pyrrole red (pigment code PR254; bright red; CAS #84632-65-5) and chrome oxide green (pigment code PG 17; chrome green; CAS #1308-38-9); or
- titanium dioxide (TiO2), yellow iron oxide (pigment code PY 42; yellow iron oxide; CAS #51274-00-1), pyrrole red (pigment code PR254; bright red; CAS #84632-65-5), quinacridone red (pigment code PR 122; magenta (pink E); CAS #980-26-7), dioxazine violet (pigment code PV 23; deep violet; CAS #6358-30-1) and chrome oxide green (pigment code PG 17; chrome green; CAS #1308-38-9).

Preferably, the particles of the flowable particulate formulation are of a hollow doughnut morphology.

Preferably, the particles of the flowable particulate formulation have a median diameter in the range 20 to 200 μm and a particle size distribution of less than 1.25. More preferably, the particles of the flowable particulate formulation have a median diameter in the range 30 to 120 μm and a particle size distribution of less than 1.25. Most preferably, the particles of the particulate formulation have a median diameter in the range 50 to 100 μm and a particle size distribution of less than 1.25.

Preferably, the flowable particulate formulation has a bulk density in the range 0.7 to 1.1 g/mL.

In a second aspect the invention provides a method of preparing a flowable particulate formulation comprising the step of spray drying an aqueous dispersion of a mixture with a total solids content of 45 to 75% (w/w) comprising at least one pigment, a hydroxylated amine, a polycarboxylic acid and a non-ionic alkoxylated surfactant. Preferably, the method comprises the step of spray drying an aqueous dispersion of a mixture with a total solids content of 45 to 75% (w/w) comprising a plurality of pigments, a hydroxylated amine, a polycarboxylic acid and a non-ionic alkoxylated surfactant. More preferably, the method comprises the step of spray drying an aqueous dispersion of a mixture with a total solids content of 45 to 75% (w/w) consisting essentially of a plurality of pigments, a hydroxylated amine, a polycarboxylic acid and a non-ionic alkoxylated surfactant.

Preferably, the step of spray drying the aqueous dispersion is at an inlet temperature in the range 180 to 240° C. and the outlet temperature is in the range 80 to 120° C. More preferably, the step of spray drying the aqueous dispersion is at an inlet temperature in the range 190 to 235° C. and the outlet temperature is in the range 90 to 110° C.

Preferably, the hydroxylated amine is 2-amino-2-methyl-1-propanol, the carboxylic acid polymer is an acrylic acid polymer and the non-ionic alkoxylated surfactant is an ethylene oxide-propylene oxide diblock copolymer. A preferred 2-amino-2-methyl-1-propanol is supplied under the trade name AMP 95™. A preferred acrylic acid polymer is supplied under the trade name RHODOLINE 226/40™. A preferred ethylene oxide-propylene oxide diblock copolymer is supplied under the trade name MAXEMULT™.

The formulations prepared by the method permit the consistent tinting of base media with uniform colour dispersion.

In a third aspect the invention provides a method of tinting a base medium to provide a medium of predetermined colour comprising the steps of adding a predetermined amount of the formulation of the first aspect of the invention to a predetermined volume of the base medium and mixing to provide the medium of predetermined colour.

Preferably, the base medium is a surface coating. More preferably, the base medium is selected from the group consisting of: paint and resin. Yet more preferably, the base medium is paint. Most preferably, the base medium is acrylate paint.

Preferably, the residual moisture content of the formulation is less than 1.5% (w/w) when the base medium is non-aqueous.

In a fourth aspect the invention provides an aliquot of the formulation of the first aspect of the invention for use in the method of the third aspect of the invention. Preferably, the aliquot is a compressed form of the formulation of the first aspect of the invention. More preferably, the aliquot is in the form of a tablet.

Preferably, the base medium is a surface coating. More preferably, the base medium is selected from the group consisting of: paint and resin. More preferably, the base medium is paint. Most preferably, the base medium is acrylate paint. A preferred acrylate paint is supplied under the trade name STOCOLOR OPTICRYL™ matt (Sto AG, Stühlingen).

Preferably, the aliquot is provided in a sealed package. More preferably, the material of the package is capable of dissolution in the base medium.

In a fifth aspect the invention provides a blend of two or more formulations of the first aspect of the invention for use in the preparation of a coloured base medium where each of the two or more formulations comprises primary particles of a different pigment.

In a sixth aspect the invention provides a package comprising two or more formulations of the first aspect of the invention for use in the preparation of a coloured base medium where each of the two or more formulations comprises primary particles of a different pigment.

Preferably, the material of the package is capable of dissolution in the base medium.

In the description and claims of this specification the following acronyms, terms and phrases have the meaning provided: "block polymer" means a polymer in which the monomers are arranged in blocks, e.g., -AAAA-BBBB-; "CAS #" means Chemical Abstracts Service (Columbus, Ohio) registry number; "comprising" means "including", "containing" or "characterized by" and does not exclude any additional element, ingredient or step; "consisting of" means excluding any element, ingredient or step not specified except for impurities and other incidentals; "consisting essentially of" means excluding any element, ingredient or step that is a material limitation and "consists essentially of" has a corresponding meaning; "copolymer" means a polymer formed by the polymerization of two or more monomers; "flowable" means capable of being poured from a container or package; "formula" means a list of ingredients with which a formulation is prepared; "formulant" means an ingredient used in the preparation of a formulation; "formulation" means a material or mixture prepared according to a formula; "hydrophilic" means having a tendency to mix with, dissolve in, or be wetted by water; "hydrophobic" means tending to repel or fail to mix with water; "pigment" means a material or substance used for tinting a base medium; "pigmentary colour" means colour observed as a consequence of the absorption of light; "plurality" means two or more; "primary particles" means the smallest particles of a comminuted material or substance; "structural colour" means colour observed as a consequence of the refraction of light; "synthetic" means prepared by chemical synthesis; "tinting" means the mixing of one or more pigments with a base medium to provide a coloured medium.

The trade name product MAXEMUL 7101™ (Product code ETK1385, Croda Europe Limited) is classified as a non-ionic alkoxylated surfactant. The product is a propylene oxide/ethylene oxide based block copolymer and is a solid with no water or solvents determined to be present by differential scanning calorimetry (DSC) analysis. A full systematic name provided for the product in the Chemical Abstracts Service (Columbus, Ohio) registry is methyloxirane-oxirane diblock copolymer (CAS #697765-47-2).

The trade name product RHODOLINE DP 226/40™ (Solvay New Zealand Limited) is classified as a dispersant and as a 40% (w/w) solution. The trade name product is identified as both an acrylic acid-methacrylic acid copolymer (Safety Data Sheet, Solvay New Zealand Limited) and an acrylic acid polymer (CAS #9003-04-7). In the description and claims of this specification the phrase "acrylic acid polymer" will be understood to encompass either or both of the polymer and copolymer.

The trade name product AMP-95™ (Dow Chemical (NZ) Limited) is classified as a hydroxylated amine and supplied as a 95% (w/w) solution of a mixture of isomers. The full systematic name provided for the product in the Chemical Abstracts Service (Columbus, Ohio) registry is 2-amino-2-methyl-1-propanol (CAS #124-68-5).

The phrase "base medium" will be understood to encompass surface coatings such as paints and resins, but most preferably surface coatings such as paint, in particular water based paint such as acrylate paint. The term "tinting" will be understood to encompass the use of materials and substances that may alter the opacity and light scattering properties of a base medium. Where reference is made to the use of "a plurality of pigments" the use of two or more pigments of different chemical composition will be understood.

The terms "first", "second", "third", etc. used with reference to elements, features or integers of the subject matter defined in the Statement of Invention and Claims, or when used with reference to alternative embodiments of the invention are not intended to imply an order of preference.

Where concentrations or ratios of formulants or reagents are specified, the concentration or ratio specified is the initial concentration or ratio of the formulants or reagents. For example, the formulant 2-amino-2-methyl-1-propanol has a boiling point close to that employed in spray drying and a portion will be lost during preparation of the particulate formulation. Where values are expressed to one or more decimal places standard rounding applies. For example, 1.7 encompasses the range 1.650 recurring to 1.7499 recurring.

The invention will now be described with reference to embodiments or examples and the FIGURE of the accompanying drawings page.

BRIEF DESCRIPTION OF DRAWING

FIG. 1. Schematic representation of a single-point discharge configuration of a spray dryer (1). The spray dryer (1) is provided with an inlet (2) and an outlet (3) and may be fitted with either a pressure nozzle or rotary atomiser (4).

DETAILED DESCRIPTION

The pigments used in tinting to provide coloured media include both inorganic and organic pigments. In addition to providing colour, inorganic pigments may be used to provide lustre or opacity. Inorganic pigments include metal oxides, salts and minerals. Examples of inorganic pigments are carbon black, titanium dioxide, iron oxides, zinc chromates, azurite ($Na_7Al_6Si_4O_{24}S_2$), chromium oxides, cadmium sulphides, lithopone (ZnS mixed with $BaSO_4$). Organic pigments are typically synthetic compounds such as monoazos, diazos, azo condensations, azo salts, azo metal complexes, benzimidazolones, phthalocyanides, anthraquinones, quinacridones, dioxazines, perylenes and thioindigos. Extender pigments (or "fillers") may also be used. Extender pigments include calcium carbonate (chalk), hydrated magnesium silicate (talc), barium sulphate (barytes), hydrated aluminium silicate (kaolin), silicon dioxide (silica) and hydrous aluminium potassium silicate (mica).

The primary particles of pigments therefore possess a diverse range of chemical and physical properties. A combination of formulants that remain effective to disperse the primary particles of a broad range of pigment preparations and combinations of the primary particles of those preparations when a spray dried formulation of the pigments is mixed with a base medium has been identified. The formulants of the combination must necessarily be compatible with each other and the pigment preparations and the preparation of particles by spray drying. In addition to being effective to disperse the primary particles of pigment when added to a base medium the requirements of both the distributors and end users of the spray dried particles must be met. These requirements include the spray dried particles having sufficient structural integrity to avoid crushing and settling during transport and storage. It will be recognised that the dispensing of a free flowing spray dried particulate formulation satisfying these requirements may be performed either gravimetrically or volumetrically.

The formulations of the invention permit the tinting of base media with uniform colour. The formulations avoid the limitations of liquid formulations, not being subject to variation attributed to evaporation. The formulations develop full colour rapidly. The formulations readily hydrate and disperse substantially eliminating the formation of agglomerates on mixing. The formulations minimise the requirement to use fillers.

The selection of formulants and spray drying conditions permits the preparation of particulate formulations of uniform dispersivity. In this context "uniform dispersivity" is referring to the dispersivity of the primary particles of the plurality of pigment preparations included in the individual particulate formulations. The invention permits primary particles of a plurality of pigments to be included in a single particulate formulation. This latter particulate formulation provides what is referred to here as a "whole colour" formulation. The formulations behave similarly in terms of their dispersivity when mixed with a base medium irrespective of the pigment preparations used. The formulations are flowable and stable, not being subject to dusting or settling, maintaining a uniform bulk density on storage.

The formulations enable a method of tinting base media to provide a medium of predetermined colour that is reproducible between locations and over time. The formulations can be supplied directly to end users as a formulation of a combination of pigment preparations ("whole colour") or a combination of formulations of single pigment preparations to be blended to provide the predetermined colour. The proprietors of custom colour ranges such as the LES COULEURS™ LE CORBUSIER colour range (Les Couleurs Suisse AG) require limited colour deviation in the colours supplied by licensees. The invention therefore permits proprietary custom colour ranges with colour deviations of less than 0.15 to be supplied by directly to end users. All colour deviations reported here were determined according to LCS guideline 001 *Metrological quality guidelines for coating systems* (Edition #5, June 2013).

General Method

Individual pigments are dispersed in an aqueous solution of formulants to provide single pigment dispersions with a Hegman gauge reading of greater than 7.5 units. The percentage of the formulants to pigment in each dispersion is maintained at 1% (w/w) of the trade name product AMP-95™ (hydroxylated amine), 3% (w/w) of the trade name product RHODOLINE DP 226/40™ (polycarboxylic acid) and 10% (w/w) of the trade name product MAXEMUL 7101™ (non-ionic alkoxylated surfactant). The dispersions are blended to provide a homogenous colour dispersion with a total solids content of 60 to 70% (w/w). This colour dispersion is then spray dried to provide a particulate formulation of colour with a median particle diameter of 20 to 120 μm, particle size distribution of less than 1.25 and bulk density of 0.9 to 1.1 g/mL. Spray drying has been performed using both a GEA Niro VERSATILE-SD™ size 6.3 spray dryer (GEA Process Engineering) equipped with a pressure nozzle (0.9 mm diameter) and a GEA Niro MOBILE MINOR™ spray dryer (GEA Process Engineering) equipped with a rotary atomiser (channel wheel). A schematic representation of single-point discharge configuration of a spray dryer is provided in FIG. 1. According to this general method a flowable particulate formulation is prepared consisting of 10 to 30% (w/w) of formulants and 70 to 90% (w/w) of two or more pigments.

Example 1

Preparation of the Pigment Formulation Designated CT-DPC-T106

The pigments titanium dioxide (TiO$_2$), yellow iron oxide (pigment code PY 42; yellow iron oxide; CAS #51274-00-1) (Lanxess), pyrrole red (pigment code PR254; bright red; CAS #84632-65-5) (Crenovo International) and chrome oxide green (pigment code PG 17; chrome green; CAS #1308-38-9) (Nubiola) were each prepared as a dispersion (Hegman gauge reading of greater than 7.5 units) in an aqueous solution containing a hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 65% (w/w).

The blended dispersion was then spray dried at a feed pressure of 34 bar using a GEA Niro VERSATILE-SD™ size 6.3 spray dryer (GEA Process Engineering) in a two-point discharge configuration equipped with a pressure nozzle of 0.9 mm diameter and operated at an inlet temperature of 230° C. and outlet temperature of 90° C.

A particulate formulation of hollow doughnut morphology with a median particle diameter of 96 μm, particle size distribution of 1.19 and bulk density of 1.02 g/mL was obtained at a rate of 58 Kg/hour (0.56% (w/w) moisture content) with 83% yield.

Example 2

Preparation of the Pigment Formulation Designated CT-DPC009

The pigments titanium dioxide (TiO$_2$), yellow iron oxide (pigment code PY 42; yellow iron oxide; CAS #51274-00-1) (Lanxess), pyrrole red (pigment code PR254; bright red; CAS #84632-65-5) (Crenovo International) and chrome oxide green (pigment code PG 17; chrome green; CAS #1308-38-9) (Nubiola) were each prepared as a dispersion (Hegman gauge reading of greater than 7.5 units) in an aqueous solution containing a hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 65% (w/w).

The blended dispersion was then spray dried using a GEA Niro MOBILE MINOR™ spray dryer (GEA Process Engineering) equipped with a rotary atomiser (channel wheel, 11,000 rpm) in a one-point discharge configuration and operated at an inlet temperature of 195° C. and outlet temperature of 110° C.

A particulate formulation of hollow doughnut morphology with a median particle diameter of 40 μm was obtained at a rate of 1.9 Kg/hour (1.2% (w/w) moisture content) with 52% yield.

Example 3

Preparation of the Pigment Formulation Designated RED (32.101)

The pigments titanium dioxide (TiO$_2$), yellow iron oxide (pigment code PY 42; yellow iron oxide; CAS #51274-00-1) (Lanxess), pyrrole red (pigment code PR254; bright red; CAS #84632-65-5) (Crenovo International), quinacridone red (pigment code PR 122; magenta (pink E); CAS #980-26-7) (Crenovo International), dioxazine violet (pigment code PV 23; deep violet; CAS #6358-30-1) (Crenovo International) and chrome oxide green (pigment code PG 17; chrome green; CAS #1308-38-9) (Nubiola) were each prepared as a dispersion (Hegman gauge reading of greater than 7.5 units) in an aqueous solution containing hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 61.5% (w/w).

The blended dispersion was then spray dried using a GEA Niro MOBILE MINOR™ spray dryer (GEA Process Engineering) equipped with a rotary atomiser (channel wheel, 13,500 rpm) in a one-point discharge configuration and operated at an inlet temperature of 200° C. and outlet temperature of 97° C.

A particulate formulation of hollow doughnut morphology with a median particle diameter of 30 μm was obtained at a rate of 1.2 Kg/hour (0.75% (w/w) moisture content) with 45.7% yield.

Examples 4 to 44

Particulate formulations with the pigment composition indicated in Tables 1 to 40 were also prepared adopting the general method described above.

TABLE 1

Composition by weight of pigments (totalling 86.9% (w/w)) included in Example 4 of the particulate formulation prepared according to the general method.

| Pigment code | Description | % (w/w) |
| --- | --- | --- |
| PY42 | Iron oxide yellow | 6.1% |
| PG17 | Chrome green oxide | 1.3% |
| PW18 | Chalk | 23.7% |
| PR101 | Iron oxide red | 0.3% |
| Barium sulfate | Barium sulfate | 55.5% |

TABLE 2

Composition by weight of pigments (totalling 84.5% (w/w)) included in Example 5 of the particulate formulation prepared according to the general method.

| Pigment code | Description | % (w/w) |
| --- | --- | --- |
| PY154 | Benzimidazolone yellow | 10.7% |
| PR102 | Natural red iron oxide | 10.0% |
| PBr8 | Manganese brown | 1.8% |
| PY42 | Iron oxide yellow | 18.9% |
| PG17 | Chrome green oxide | 1.5% |
| PW6 | Titanium dioxide | 41.6% |

TABLE 3

Composition by weight of pigments (totalling 79.5% (w/w)) included in Example 6 of the particulate formulation prepared according to the general method.

| Pigment code | Description | % (w/w) |
| --- | --- | --- |
| PBr8 | Manganese brown | 12.6% |
| PY42 | Iron oxide yellow | 50.3% |
| PG17 | Chrome green oxide | 16.6% |

TABLE 4

Composition by weight of pigments (totalling 86.7% (w/w)) included in Example 7 of the particulate formulation prepared according to the general method.

| Pigment code | Description | % (w/w) |
| --- | --- | --- |
| PB29 | Ultramarine blue | 0.3% |
| PG17 | Chrome green oxide | 1.2% |
| PY42 | Iron oxide yellow | 5.2% |
| PR101 | Iron oxide red | 1.3% |
| Barium sulfate | Barium sulfate | 78.7% |

TABLE 5

Composition by weight of pigments (totalling 75.8% (w/w)) included in Example 8 of the particulate formulation prepared according to the general method.

| Pigment code | Description | % (w/w) |
| --- | --- | --- |
| PG7 | Phthalocyanine green | 0.4% |
| PR102 | Natural red iron oxide | 11.1% |
| PBk9 | Bone black | 27.1% |
| PY42 | Iron oxide yellow | 37.2% |

TABLE 6

Composition by weight of pigments (totalling 87.2% (w/w)) included in Example 10 of the particulate formulation prepared according to the general method.

| Pigment code | Description | % (w/w) |
| --- | --- | --- |
| PW18 | Chalk | 54.8% |
| PY42 | Iron oxide yellow | 2.2% |
| PW6 | Titanium dioxide | 30.2% |

TABLE 7

Composition by weight of pigments (totalling 83.2% (w/w)) included in Example 11 of the particulate formulation prepared according to the general method.

| Pigment code | Description | % (w/w) |
| --- | --- | --- |
| PBk9 | Bone black | 9.0% |
| PY42 | Iron oxide yellow | 15.6% |
| PG17 | Chrome green oxide | 1.7% |
| Barium sulfate | Barium sulfate | 56.9% |

TABLE 8

Composition by weight of pigments (totalling 73.0% (w/w)) included in Example 12 of the particulate formulation prepared according to the general method.

| Pigment code | Description | % (w/w) |
| --- | --- | --- |
| PBk9 | Bone black | 43.3% |
| PY42 | Iron oxide yellow | 28.6% |
| PR254 | Pyrrole red | 1.1% |

TABLE 9

Composition by weight of pigments (totalling 82.3% (w/w)) included in Example 13 of the particulate formulation prepared according to the general method.

| Pigment code | Description | % (w/w) |
| --- | --- | --- |
| PBk9 | Bone black | 19.3% |
| PY43 | Natural yellow iron oxide | 44.2% |
| PR102 | Natural red iron oxide | 8.3% |
| Barium sulfate | Barium sulfate | 10.5% |

TABLE 10

Composition by weight of pigments (totalling 74.3% (w/w)) included in Example 14 of the particulate formulation prepared according to the general method.

| Pigment code | Description | % (w/w) |
|---|---|---|
| PBk9 | Bone black | 29.6% |
| PG7 | Phthalocyanine green | 14.0% |
| PR254 | Pyrrole red | 4.2% |
| PY42 | Iron oxide yellow | 26.5% |

TABLE 11

Composition by weight of pigments (totalling 87.2% (w/w)) included in Example 15 of the particulate formulation prepared according to the general method.

| Pigment code | Description | % (w/w) |
|---|---|---|
| PY42 | Iron oxide yellow | 3.3% |
| PW18 | Chalk | 20.8% |
| PR101 | Iron oxide red | 1.9% |
| Barium sulfate | Barium sulfate | 61.2% |

TABLE 12

Composition by weight of pigments (totalling 87.3% (w/w)) included in Example 16 of the particulate formulation prepared according to the general method.

| Pigment code | Description | % (w/w) |
|---|---|---|
| PY43 | Natural yellow iron oxide | 35.5% |
| Barium sulfate | Barium sulfate | 51.8% |

TABLE 13

Composition by weight of pigments (totalling 84.8% (w/w)) included in Example 17 of the particulate formulation prepared according to the general method.

| Pigment code | Description | % (w/w) |
|---|---|---|
| PBr8 | Manganese brown | 21.6% |
| Barium sulfate | Barium sulfate | 63.2% |

TABLE 14

Composition by weight of pigments (totalling 85.5% (w/w)) included in Example 18 of the particulate formulation prepared according to the general method.

| Pigment code | Description | % (w/w) |
|---|---|---|
| PBk9 | Bone black | 5.3% |
| PY43 | Natural yellow iron oxide | 1.2% |
| PY42 | Iron oxide yellow | 4.9% |
| PR101 | Iron oxide red | 3.0% |
| Barium sulfate | Barium sulfate | 71.1% |

TABLE 15

Composition by weight of pigments (totalling 75.5% (w/w)) included in Example 19 of the particulate formulation prepared according to the general method.

| Pigment code | Description | % (w/w) |
|---|---|---|
| PBk9 | Bone black | 24.4% |
| PR254 | Pyrrole red | 4.8% |
| PG7 | Phthalocyanine green | 1.5% |
| PY42 | Iron oxide yellow | 44.8% |

TABLE 16

Composition by weight of pigments (totalling 89.1% (w/w)) included in Example 20 of the particulate formulation prepared according to the general method.

| Pigment code | Description | % (w/w) |
|---|---|---|
| PBk9 | Manganese brown | 0.4% |
| PR254 | Natural iron oxide yellow | 1.2% |
| PG7 | Ultramarine blue | 0.3% |
| PY42 | Yellow iron oxide | 0.9% |
| Barium sulfate | Barium sulfate | 86.3% |

TABLE 17

Composition by weight of pigments (totalling 87.1% (w/w)) included in Example 21 of the particulate formulation prepared according to the general method.

| Pigment code | Description | % (w/w) |
|---|---|---|
| PY42 | Iron oxide yellow | 3.5% |
| PG17 | Chrome green oxide | 7.5% |
| PR101 | Iron oxide red | 3.8% |
| Barium sulfate | Barium sulfate | 72.3% |

TABLE 18

Composition by weight of pigments (totalling 75.6% (w/w)) included in Example 22 of the particulate formulation prepared according to the general method.

| Pigment code | Description | % (w/w) |
|---|---|---|
| PG7 | Phthalocyanine green | 1.0% |
| PBk9 | Bone black | 22.8% |
| PY42 | Iron oxide yellow | 48.1% |
| PR101 | Iron oxide red | 3.7% |

TABLE 19

Composition by weight of pigments (totalling 86.4% (w/w)) included in Example 23 of the particulate formulation prepared according to the general method.

| Pigment code | Description | % (w/w) |
|---|---|---|
| PY42 | Iron oxide yellow | 9.0% |
| PG17 | Chrome green oxide | 16.7% |
| PR101 | Iron oxide red | 2.5% |
| Barium sulfate | Barium sulfate | 58.2% |

TABLE 20

Composition by weight of pigments (totalling 75.8% (w/w)) included in Example 24 of the particulate formulation prepared according to the general method.

| Pigment code | Description | % (w/w) |
|---|---|---|
| PG7 | Phthalocyanine green | 2.1% |
| PBk9 | Bone black | 27.1% |
| PY42 | Iron oxide yellow | 36.0% |
| PR101 | Iron oxide red | 10.6% |

TABLE 21

Composition by weight of pigments (totalling 86.5% (w/w)) included in Example 25 of the particulate formulation prepared according to the general method.

| Pigment code | Description | % (w/w) |
|---|---|---|
| PBk9 | Bone black | 3.9% |
| PY43 | Natural yellow iron oxide | 4.2% |
| Barium sulfate | Barium sulfate | 78.4% |

TABLE 22

Composition by weight of pigments (totalling 80.3% (w/w)) included in Example 26 of the particulate formulation prepared according to the general method.

| Pigment code | Description | % (w/w) |
|---|---|---|
| PB15.3 | Phthalocyanine blue | 0.9% |
| PBk9 | Bone black | 19.3% |
| PR101 | Iron oxide red | 2.2% |
| PY42 | Iron oxide yellow | 17.3% |
| Barium sulfate | Barium sulfate | 40.6% |

TABLE 23

Composition by weight of pigments (totalling 73.3% (w/w)) included in Example 27 of the particulate formulation prepared according to the general method.

| Pigment code | Description | % (w/w) |
|---|---|---|
| PG7 | Phthalocyanine green | 1.4% |
| PR254 | Pyrrole red | 0.7% |
| PBk9 | Bone black | 43.7% |
| PB15.3 | Phthalocyanine blue | 0.5% |
| PY42 | Iron oxide yellow | 20.9% |
| PR101 | Iron oxide red | 6.1% |

TABLE 24

Composition by weight of pigments (totalling 87.5% (w/w)) included in Example 29 of the particulate formulation prepared according to the general method.

| Pigment code | Description | % (w/w) |
|---|---|---|
| PY42 | Iron oxide yellow | 0.5% |
| PW18 | Chalk | 47.5% |
| PW6 | Titanium dioxide | 22.8% |
| Barium sulfate | Barium sulfate | 16.7% |

TABLE 25

Composition by weight of pigments (totalling 86.9% (w/w)) included in Example 29 of the particulate formulation prepared according to the general method.

| Pigment code | Description | % (w/w) |
|---|---|---|
| PBk9 | Bone black | 1.9% |
| PB15.3 | Phthalocyanine blue | 0.1% |
| PY42 | Iron oxide yellow | 1.2% |
| Barium sulfate | Barium sulfate | 83.7% |

TABLE 26

Composition by weight of pigments (totalling 86.9% (w/w)) included in Example 30 of the particulate formulation prepared according to the general method.

| Pigment code | Description | % (w/w) |
|---|---|---|
| PB15.3 | Phthalocyanine blue | 4.3% |
| PY154 | Benzimidazolone yellow | 11.8% |
| PR254 | Pyrrole red | 4.3% |
| Barium sulfate | Barium sulfate | 66.5% |

TABLE 27

Composition by weight of pigments (totalling 83.3% (w/w)) included in Example 31 of the particulate formulation prepared according to the general method.

| Pigment code | Description | % (w/w) |
|---|---|---|
| PB15.3 | Phthalocyanine blue | 8.8% |
| PR254 | Pyrrole red | 6.3% |
| PR101 | Iron oxide red | 45.6% |
| PY42 | Iron oxide yellow | 22.6% |

TABLE 28

Composition by weight of pigments (totalling 86.3% (w/w)) included in Example 32 of the particulate formulation prepared according to the general method.

| Pigment code | Description | % (w/w) |
|---|---|---|
| PBk9 | Bone black | 4.9% |
| PY43 | Natural yellow iron oxide | 8.5% |
| Barium sulfate | Barium sulfate | 72.9% |

TABLE 29

Composition by weight of pigments (totalling 84.7% (w/w)) included in Example 33 of the particulate formulation prepared according to the general method.

| Pigment code | Description | % (w/w) |
|---|---|---|
| PY43 | Natural yellow iron oxide | 21.1% |
| PB29 | Ultramarine blue | 14.9% |
| Barium sulfate | Barium sulfate | 48.7% |

TABLE 30

Composition by weight of pigments (totalling 73.7% (w/w)) included in Example 34 of the particulate formulation prepared according to the general method.

| Pigment code | Description | % (w/w) |
|---|---|---|
| PBk9 | Bone black | 52.4% |
| Barium sulfate | Barium sulfate | 21.3% |

TABLE 31

Composition by weight of pigments (totalling 83.1% (w/w)) included in Example 35 of the particulate formulation prepared according to the general method.

| Pigment code | Description | % (w/w) |
|---|---|---|
| PBk9 | Bone black | 14.4% |
| PR102 | Natural red iron oxide | 5.1% |
| PY42 | Iron oxide yellow | 5.4% |
| PG17 | Chrome green oxide | 4.6% |
| Barium sulfate | Barium sulfate | 53.6% |

TABLE 32

Composition by weight of pigments (totalling 76.1% (w/w)) included in Example 36 of the particulate formulation prepared according to the general method.

| Pigment code | Description | % (w/w) |
|---|---|---|
| PBk9 | Bone black | 37.2% |
| PR102 | Natural red iron oxide | 13.1% |
| PY42 | Iron oxide yellow | 13.9% |
| PG17 | Chrome green oxide | 11.9% |

TABLE 33

Composition by weight of pigments (totalling 86.9% (w/w)) included in Example 37 of the particulate formulation prepared according to the general method.

| Pigment code | Description | % (w/w) |
|---|---|---|
| PBk9 | Bone black | 3.9% |
| PW18 | Chalk | 54.6% |
| Barium sulfate | Barium sulfate | 28.4% |

TABLE 34

Composition by weight of pigments (totalling 83.0% (w/w)) included in Example 38 of the particulate formulation prepared according to the general method.

| Pigment code | Description | % (w/w) |
|---|---|---|
| PBk9 | Bone black | 15.5% |
| P242 | Iron oxide yellow | 4.9% |
| PR101 | Iron oxide red | 0.4% |
| Barium sulfate | Barium sulfate | 62.2% |

TABLE 35

Composition by weight of pigments (totalling 82.8% (w/w)) included in Example 39 of the particulate formulation prepared according to the general method.

| Pigment code | Description | % (w/w) |
|---|---|---|
| PBk9 | Bone black | 16.4% |
| PG7 | Phthalocyanine green | 1.0% |
| PR254 | Pyrrole red | 1.8% |
| PY43 | Natural yellow iron oxide | 63.6% |

TABLE 36

Composition by weight of pigments (totalling 85.7% (w/w)) included in Example 40 of the particulate formulation prepared according to the general method.

| Pigment code | Description | % (w/w) |
|---|---|---|
| PG7 | Phthalocyanine green | 4.2% |
| PY154 | Benzimidazolone yellow | 7.9% |
| PY139 | Isoindoline yellow | 1.9% |
| PY42 | Iron oxide yellow | 3.7% |
| PR101 | Iron oxide red | 16.1% |
| PW6 | Titanium dioxide | 51.9% |

TABLE 37

Composition by weight of pigments (totalling 84.2% (w/w)) included in Example 41 of the particulate formulation prepared according to the general method.

| Pigment code | Description | % (w/w) |
|---|---|---|
| PG7 | Phthalocyanine green | 5.9% |
| PV23 | Dioxazine violet | 1.5% |
| PR254 | Pyrrole red | 1.0% |
| PY154 | Benzimidazolone yellow | 3.0% |
| PY42 | Iron oxide yellow | 12.7% |
| PW6 | Titanium dioxide | 56.5% |
| PR101 | Iron oxide red | 3.6% |

TABLE 38

Composition by weight of pigments (totalling 84.5% (w/w)) included in Example 42 of the particulate formulation prepared according to the general method.

| Pigment code | Description | % (w/w) |
|---|---|---|
| PB15.3 | Phthalocyanine blue | 12.4% |
| PG7 | Phthalocyanine green | 5.4% |
| PR254 | Pyrrole red | 3.5% |
| PR101 | Iron oxide red | 32.1% |
| PW6 | Titanium dioxide | 31.1% |

TABLE 39

Composition by weight of pigments (totalling 84.4% (w/w)) included in Example 43 of the particulate formulation prepared according to the general method.

| Pigment code | Description | % (w/w) |
|---|---|---|
| PR254 | Pyrrole red | 8.5% |
| PG7 | Phthalocyanine green | 0.4% |
| PR102 | Natural red iron oxide | 17.2% |
| PY139 | Isoindoline yellow | 1.8% |
| PR101 | Iron oxide red | 9.6% |
| PY42 | Iron oxide yellow | 20.6% |
| PW6 | Titanium dioxide | 26.3% |

TABLE 40

Composition by weight of pigments (totalling 82.4% (w/w)) included in Example 44 of the particulate formulation prepared according to the general method.

| Pigment code | Description | % (w/w) |
|---|---|---|
| PR254 | Pyrrole red | 48.3% |
| PB15.3 | Phthalocyanine blue | 1.5% |
| PR122 | Quinacridone red | 13.3% |
| PG7 | Phthalocyanine green | 0.8% |
| PY154 | Benzimidazolone yellow | 3.2% |
| PR101 | Iron oxide red | 8.2% |
| PW6 | Titanium dioxide | 7.1% |

Performance of Pigment Formulations

The relative tint strengths of a matt acrylic base paint (STOCOLOR OPTICRYL™ matt, Sto AG, Stühlingen) coloured with 10% (w/w) of the formulation designated CT-DPC-T106 before spray drying ('WET') and after spray drying ('DRY') were determined. The relative tint strengths of a matt acrylic base paint (STOCOLOR OPTICRYL™ matt, Sto AG, Stühlingen) coloured with 10% (w/w) of a formulation of the pigment yellow iron oxide (pigment code PY 42; yellow iron oxide; CAS #51274-00-1) (Lanxess) before spray drying ('WET') and after spray drying ('DRY') were also determined. Both formulations were prepared according to the same general method and relative tint strengths determined by instrumental evaluation (Anon (2007)). The determinations are provided in Tables 41, 42 and 43.

TABLE 41

The relative tint strengths of a matt acrylic base paint (STOCOLOR OPTICRYL ™ matt, Sto AG, Stühlingen) coloured with 10% (w/w) of the formulation designated CT-DPC-T106 before spray drying ('WET') and after spray drying ('DRY') as determined by instrumental evaluation at 500 nm (Anon (2007)).

| WET | | | DRY | | |
|---|---|---|---|---|---|
| Standard | Relative | Relative tint strength | Standard | Relative | Relative tint strength |
| 0.4116 | 0.4116 | 100.0% | 0.4116 | 0.4140 | 98.6% |
| 0.4116 | 0.4138 | 98.7% | 0.4116 | 0.4118 | 99.9% |
| 0.4116 | 0.4139 | 98.7% | 0.4116 | 0.4123 | 99.6% |
| 0.4116 | 0.4130 | 99.2% | 0.4116 | 0.4129 | 99.2% |
| 0.4116 | 0.4133 | 99.0% | 0.4116 | 0.4123 | 99.6% |
| 0.4116 | 0.4125 | 99.5% | 0.4116 | 0.4122 | 99.7% |
| 0.4116 | 0.4124 | 99.5% | 0.4116 | 0.4134 | 99.0% |
| | | | 0.4116 | 0.4129 | 99.2% |

TABLE 42

The relative tint strengths of a matt acrylic base paint (STOCOLOR OPTICRYL ™ matt, Sto AG, Stühlingen) coloured with 10% (w/w) of a formulation of the pigment yellow iron oxide (pigment code PY 42; yellow iron oxide; CAS# 51274-00-1) (Lanxess) before spray drying ('WET') and after spray drying ('DRY') as determined by instrumental evaluation at 500 nm (Anon (2007)). Relative tint strengths provided by use of the unformulated pigment determined at the same wavelength by the same method are also provided ('RAW').

| | standard | WET | DRY | RAW | WET | DRY | RAW |
|---|---|---|---|---|---|---|---|
| 1 | 22.81 | 22.81 | 22.42 | 28.38 | 100% | 98% | 79% |
| 1b | 22.81 | 22.76 | 22.45 | 28.39 | 100% | 98% | 79% |
| 2 | 22.81 | 22.62 | 22.49 | 28.71 | 99% | 99% | 78% |
| 2b | 22.81 | 22.63 | 22.56 | 28.69 | 99% | 99% | 78% |
| 3 | 22.81 | 22.62 | 22.52 | 29.55 | 99% | 99% | 76% |
| 3b | 22.81 | 22.57 | 22.48 | 28.88 | 99% | 98% | 77% |
| 4 | 22.81 | 22.70 | 22.63 | 32.94 | 100% | 99% | 67% |
| 4b | 22.81 | 22.67 | 22.66 | | 99% | 99% | |
| 5 | 22.81 | 22.61 | | | 99% | | |
| 5b | 22.81 | 22.57 | | | 99% | | |

TABLE 43

The relative tint strengths of a matt acrylic base paint (STOCOLOR OPTICRYL ™ matt, Sto AG, Stühlingen) coloured with 10% (w/w) of a formulation of the pigment yellow iron oxide (pigment code PY 42; yellow iron oxide; CAS# 51274-00-1) (Lanxess) before spray drying ('WET') and after spray drying ('DRY') as determined by instrumental evaluation at 420 nm (Anon (2007)). Relative tint strengths provided by use of the unformulated pigment determined at the same wavelength by the same method are also provided ('RAW').

| | standard | WET | DRY | RAW | WET | DRY | RAW |
|---|---|---|---|---|---|---|---|
| 1 | 12.82 | 12.91 | 12.56 | 17.17 | 101% | 98% | 72% |
| 1b | 12.82 | 12.82 | 12.63 | 17.13 | 100% | 98% | 72% |
| 2 | 12.82 | 12.77 | 12.68 | 17.48 | 100% | 99% | 70% |
| 2b | 12.82 | 12.72 | 12.67 | 16.20 | 99% | 99% | 76% |
| 3 | 12.82 | 12.80 | 12.60 | 18.15 | 100% | 98% | 67% |
| 3b | 12.82 | 12.75 | 12.62 | 17.58 | 99% | 98% | 70% |
| 4 | 12.82 | 12.79 | 12.74 | 21.82 | 100% | 99% | 55% |
| 4b | 12.82 | 12.86 | 12.75 | | 100% | 99% | |
| 5 | 12.82 | 12.75 | | | 99% | | |
| 5b | 12.82 | 12.76 | | | 99% | | |

No significant difference was observed between the tint strength of wet and dried formulations indicating that the uniform dispersibility of the pigment(s) is maintained through the spray drying process.

Comparative Examples

The performance of the particulate formulations prepared according to the general method was compared with that of commercially available XFAST™ pigment formulations (BASF). Single pigment particulate formulations comprising either the pigment titanium dioxide (TiO$_2$) or the pigment copper phthalocyanine (FASTOGEN™ blue CA5380) were prepared according to the general method. A comparison of the physical characteristics of the two particulate formulations prepared by the general method and two commercially available single pigment formulations is presented in Table 44.

TABLE 44

Comparison of the physical characteristics of particulate formulations of the invention ('White' and 'Blue') and commercially available XFAST ™ formulations (BASF). The mean particle size was estimated by microscopy.

|  | White | Blue | XFAST ™ white 0025 (BASF) | XFAST ™ blue 7080 (BASF) |
|---|---|---|---|---|
| Pigment composition | Titanium dioxide | Copper phthalocyanine | Titanium dioxide | Copper phthalocyanine |
| Mean particle size (μm) | 30 | 35 | 330 | 240 |
| Bulk density (g/mL) | 1.15 | 0.75 | 0.9 | 0.6 |
| Particulate morphology | Spherical hollow donut | Spherical hollow donut | Spherical hollow donut | Spherical hollow donut |

A blend of the single pigment formulations was used to colour a matt acrylic base paint (STOCOLOR OPTICRYL™ matt, Sto AG, Stühlingen) and the colour deviation of replicate blends for the two pigment systems compared (Table 45 and Table 46). A formulation comprising a combination of pigments was also used to colour the matt acrylic base paint (STOCOLOR OPTICRYL™ matt, Sto AG, Stühlingen) and the colour deviation of replicate blends compared (Table 47).

TABLE 45

Colour spectrum analysis of a matt acrylic base paint (STOCOLOR OPTICRYL ™ matt, Sto AG, Stühlingen) coloured with a blend of single pigment formulations prepared according to the invention.

|  | L | a | b | C | H | Colour deviation |
|---|---|---|---|---|---|---|
| LA | −0.04 | −0.02 | −0.02 | 0.02 | 0.00 | 0.05 |
| 1B | −0.03 | −0.02 | 0.00 | 0.01 | −0.02 | 0.05 |
| 2A | −0.14 | 0.03 | 0.04 | −0.05 | 0.01 | 0.15 |
| 2B | −0.12 | −0.02 | 0.01 | 0.00 | −0.02 | 0.14 |
| 3A | −0.23 | 0.01 | −0.06 | 0.05 | 0.04 | 0.23 |
| 3B | −0.25 | 0.07 | −0.05 | 0.01 | 0.08 | 0.27 |
| 4A | −0.17 | 0.02 | −0.01 | −0.01 | 0.02 | 0.18 |
| 4B | −0.14 | 0.02 | 0.00 | −0.01 | 0.02 | 0.14 |
| SA | −0.05 | −0.11 | −0.07 | 0.12 | −0.06 | 0.17 |
| 5B | −0.10 | −0.02 | −0.02 | 0.04 | 0.00 | 0.12 |
| Average | 0.13 | 0.00 | −0.02 | 0.02 | 0.01 | 0.15 |
| SD | 0.07 | 0.05 | 0.03 | 0.04 | 0.04 | 0.07 |

TABLE 46

Colour spectrum analysis of a matt acrylic base paint (STOCOLOR OPTICRYL ™ matt, Sto AG, Stühlingen) coloured with a blend of XFAST ™ single pigment formulations.

|  | L | a | b | C | H | Colour deviation |
|---|---|---|---|---|---|---|
| BASF-1A | −2.20 | 0.92 | −0.40 | 0.30 | 1.19 | 2.56 |
| BASF-1B | −2.35 | 1.03 | −0.45 | −0.07 | 1.13 | 2.61 |
| BASF-2A | −0.52 | 0.17 | −0.14 | 0.04 | 0.21 | 0.57 |
| BASF-2B | −0.49 | 0.27 | −0.07 | −0.06 | 0.27 | 0.58 |
| BASF-3A | −0.45 | 0.20 | −0.10 | −0.01 | 0.23 | 0.52 |
| BASF-3B | −0.44 | 0.17 | −0.11 | 0.02 | 0.20 | 0.49 |
| BASF-4A | −2.14 | 0.90 | −0.51 | 0.04 | 1.03 | 2.38 |
| BASF-4B | −2.18 | 0.90 | −0.51 | 0.04 | 1.03 | 2.42 |
| BASF-5A | 0.05 | −0.02 | 0.00 | 0.00 | −0.01 | 0.07 |
| BASF-5B | −0.11 | 0.04 | 0.02 | −0.03 | 0.03 | 0.13 |
| Average | −1.08 | 0.46 | −0.23 | 0.03 | 0.53 | 1.23 |
| SD | 0.94 | 0.40 | 0.20 | 0.10 | 0.47 | 1.04 |

TABLE 47

Colour spectrum analysis of a matt acrylic base paint (STOCOLOR OPTICRYL ™ matt, Sto AG, Stühlingen) coloured with a "whole colour" formulation prepared according to the invention.

|  | L | a | b | C | H | Colour deviation |
|---|---|---|---|---|---|---|
| T106-1A | −0.01 | 0.03 | −0.01 | 0.01 | −0.03 | 0.05 |
| T106-1B | 0.02 | 0.04 | 0.02 | 0.03 | −0.02 | 0.05 |
| T106-2A | 0.04 | −0.03 | 0.02 | −0.01 | 0.04 | 0.05 |
| T106-2B | 0.03 | −0.04 | 0.02 | −0.01 | 0.05 | 0.06 |
| T106-3A | 0.00 | 0.04 | 0.01 | 0.04 | −0.02 | 0.05 |
| T106-3B | 0.02 | 0.02 | 0.05 | 0.07 | 0.02 | 0.07 |
| T106-4A | 0.05 | 0.00 | −0.01 | −0.01 | −0.01 | 0.06 |
| T106-4B | 0.06 | 0.04 | −0.02 | 0.00 | −0.04 | 0.08 |
| Average | 0.03 | 0.01 | 0.01 | 0.02 | 0.00 | 0.06 |
| SD | 0.024 | 0.029 | 0.022 | 0.026 | 0.029 | 0.011 |

The colour deviation determined for colouring with a blend of single pigment formulations or a formulation of a combination of pigments prepared according to the invention is less than that determined for colouring with a blend of the commercially available XFAST™ single pigment formulations.

Alternative formulants were evaluated for use in the formulation of pigment preparations. The formulants evaluated for use included those supplied under the following trade names: TIGO DISPERS 656™, TIGO DISPERS 653™, TIGO DISPERS 610™, TIGO DISPERS 685™, TIGO DISPERS 651™, TIGO DISPERS 652™, TIGO DISPERS 750W™, TIGO DISPERS 735W™, TIGO DISPERS 715W™, POLYSPERSE 7™ (Nuplex), DISPER BYK 022™, DISPER BYK 190™, DISPER BYK 199™, DISPER BYK 2015™, DISPER BYK 2012™, DISPER BYK 2010™, LDA 100™ (Lorama Group), ZEPHRYM PD 3315™, ZEPHRYM PD 4913™, ZEPHRYM 3300B™, ZEPHRYM PD 7000™ and the formulants ethylenediamine tetrakis (ethoxylate-block-propoxylate)tetrol or ethylenediamine tetrakis (propoxylate-block-ethoxylate) tetrol. The formulae of examples of formulations comprising one or more of these alternative formulants and inorganic or organic pigments are provided in Tables 48 to 52.

TABLE 48

Composition by weight (the balance being water) of the formulation of Comparative Example 1.

| Ingredient | Description | % (w/w) |
|---|---|---|
| PBk11 | Iron oxide black | 68.2 |
| TEGO DISPERS 656 |  | 4.6 |
| TEGO DISPERS 652 |  | 0.6 |

TABLE 49

Composition by weight (the balance being water) of the formulation of Comparative Example 2.

| Ingredient | Description | % (w/w) |
|---|---|---|
| PB29 | Ultramarine blue | 44.2 |
| DISPER BYK 190 |  | 20.4 |

TABLE 50

Composition by weight (the balance being water) of the formulation of Comparative Example 3.

| Ingredient | Description | % (w/w) |
| --- | --- | --- |
| PV16 | manganese violet | 43.1 |
| AEROSIL 200 | | 108 |
| DISPER BYK 199 | | 12.9 |
| PEG 400 | | 7.8 |

TABLE 51

Composition by weight (the balance being water) of the formulation of Comparative Example 4.

| Ingredient | Description | % (w/w) |
| --- | --- | --- |
| PB29 | Ultramarine blue | 34.9 |
| DISPER BYK 199 | | 18.1 |
| ACROPOL | | 20.3 |

TABLE 52

Composition by weight (the balance being water) of the formulation of Comparative Example 5.

| Ingredient | Description | % (w/w) |
| --- | --- | --- |
| PR101 | Iron oxide red | 63.6 |
| AEROSIL 200 | | 1.2 |
| TEGO DISPERS 656 | | 5.5 |
| TEGO DISPERS 652 | | 0.6 |
| PEG 400 | | 0.2 |
| FORMEX 825 | | 0.2 |

Aqueous dispersions of the formulations provided in Tables 48 to 52 were initially prepared using a high speed disperser. Each of these aqueous dispersions effectively tinted an acrylic paint base medium. However, the performance of the formulations deteriorated following spray drying. Each of the aqueous dispersions was spray dried using a bench top spray dryer (Buchi 290). Drying conditions were required to be optimised for each formulation.

It was observed that the primary particles of pigment of some of the spray dried formulations (Comparative Examples 1 to 4) no longer adequately dispersed when the spray dried formulation was added to the acrylic paint base medium. All these formulations displayed moderate to severe flooding when added to this base medium. The initial performance of a spray dried formulation (Comparative Example 5) was satisfactory, but after a 10 day period of storage the performance of this formulation deteriorated and displayed increasing flooding when added to the base medium.

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

REFERENCED PUBLICATIONS

Anon (2007) Standard test methods for relative tinting strength of paste-type printing ink dispersions (D2006-07) ASTM International, 100 Bar Harbor Drive, PO Box C 700, West Conshohocken, Pa. 19428-2959, United States.

Anon (2010) Standard test method for fineness of dispersion of pigment-vehicle systems by Hegman-type gage (D1210-05) ASTM International, 100 Bar Harbor Drive, PO Box C 700, West Conshohocken, Pa. 19428-2959, United States.

Aoba et al (2001) Composite pigments, colouring compositions, and image recording substances European Patent application no. 00114914.5 [publ. no. EP 1070747 A2].

Kruithof et al (2010) Pigment preparation U.S. Pat. No. 7,846,997.

Lacy et al (2014) Dry colour systems and methods International application no. PCT/NZ2014/000026 [publ. no. WO 2017/137226 A2].

McKay (1973) Process for the production of flocculation resistant pigments U.S. Pat. No. 3,770,476.

Ortalano et al (2008) Stir-in form of pigment U.S. Pat. No. 7,459,017.

Rance et al (2007) Encapsulated colorants for waterborne coating compositions system kit and method International application no. PCT/US2007/066066 [publ. no. WO 2007/115335 A2].

Reisacher and Gomez (2007) Pigment granules U.S. Pat. No. 7,198,668.

Reisacher et al (2008) Solid pigment preparations containing water-soluble surface-active additives and anti-*oxidants* U.S. patent application Ser. No. 11/995,129 (publ. no. 2008/0190319 A1).

Roy et al (2010) Pigment preparation U.S. Pat. No. 7,842,757.

Tauber et al (2010) Pigment preparation, method for producing the same and its use U.S. patent application Ser. No. 12/602,959 [publ. no. US 2010/0180794 A1].

Thompson et al (2009) Novel crystal forms of quinacridones made from 2,9-dimethyoxyquinacridone and 2,9-dichloroquinacridone International application no. PCT/US2009/041698 [publ. no. WO 2009/132293 A1].

Wenning and Loest (2010) Compositions for producing universal pigment preparations U.S. Pat. No. 7,834,098.

Wilkinson (1966) Solid solutions U.S. Pat. No. 3,259,514.

The invention claimed is:

1. A spray dried particulate formulation consisting essentially of a plurality of pigments and 0.5 to 3.6% (w/w) hydroxylated amine, 0.56 to 4.52% (w/w) acrylic acid polymer and 4.5 to 37.7% (w/w) ethylene oxide-propylene oxide diblock copolymer.

2. The formulation of claim 1 consisting essentially of a plurality of pigments and 0.5 to 2.3% (w/w) hydroxylated amine, 0.8 to 2.8% (w/w) acrylic acid polymer and 7.5 to 19% (w/w) ethylene oxide-propylene oxide diblock copolymer.

3. The formulation of claim 2 where the particles are of a hollow doughnut morphology.

4. The formulation of claim 3 where the formulation has a bulk density in the range 0.7 to 1.1 g/mL.

5. The formulation of claim 4 where the particles have a median diameter in the range 20 to 200 µm and a particle size distribution of less than 1.25.

6. The formulation of claim 5 where the particles have a median diameter in the range 30 to 120 µm and a particle size distribution of less than 1.25.

7. The formulation of claim 6 where the particles have a median diameter in the range 50 to 100 µm and a particle size distribution of less than 1.25.

8. The formulation of claim 1 where the hydroxylated amine is 2-amino-2-methyl-1-propanol.

* * * * *